Sept. 5, 1944.    J. R. HANSEN    2,357,329
DIVIDING HEAD
Filed Nov. 6, 1941    2 Sheets-Sheet 1
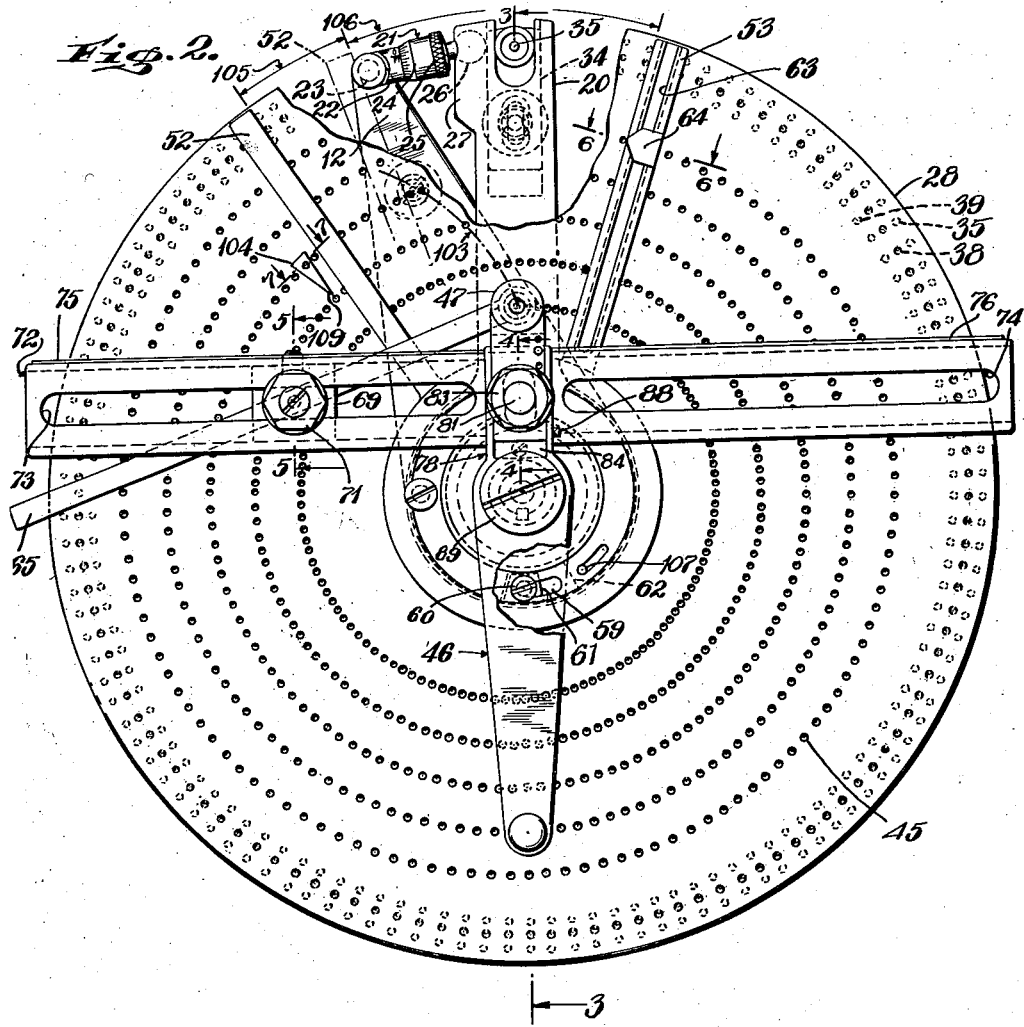
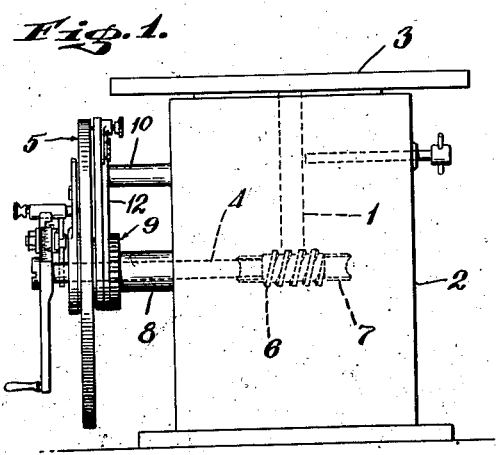
INVENTOR
JAMES R. HANSEN
BY
ATTORNEY

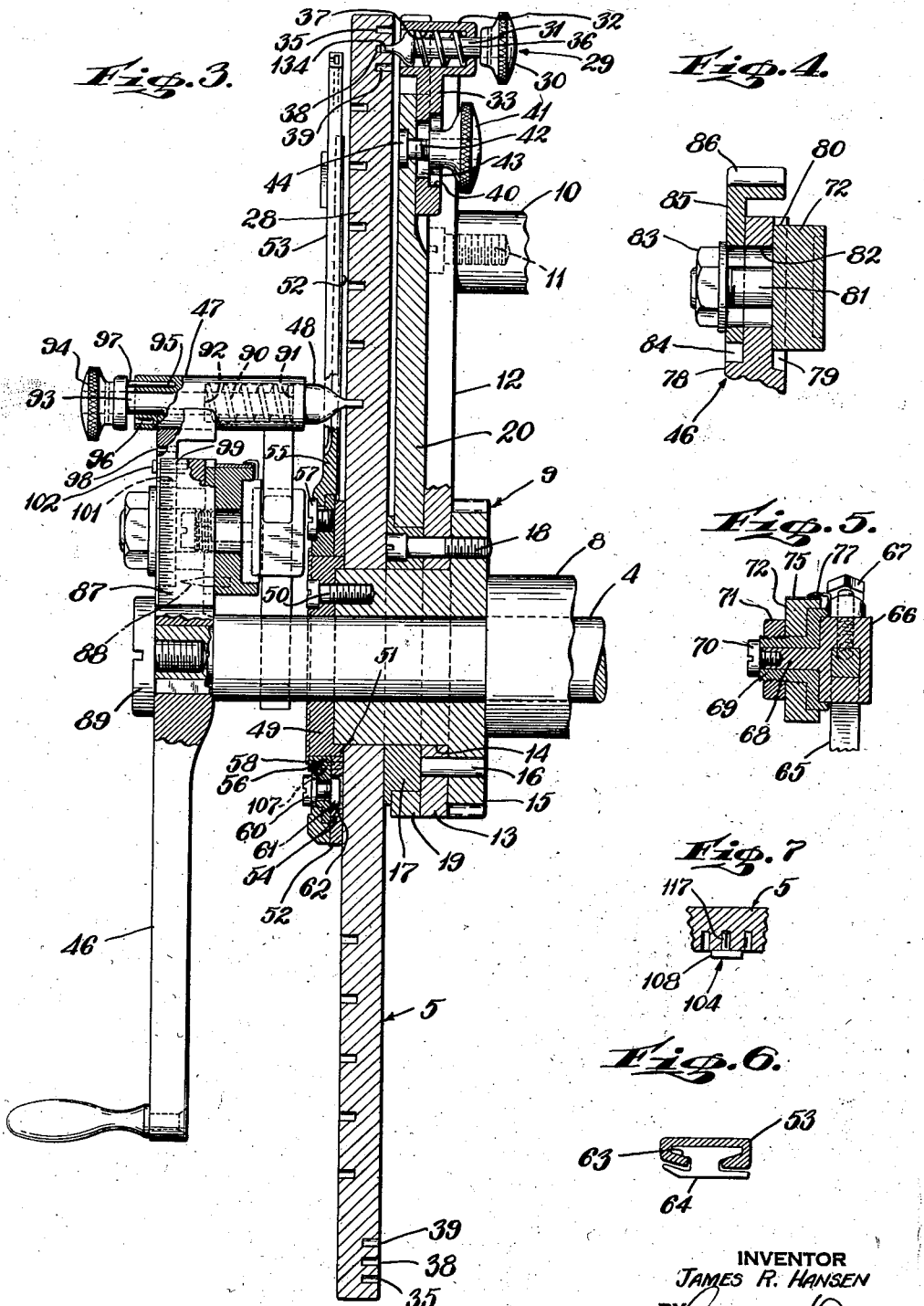

Patented Sept. 5, 1944

2,357,329

UNITED STATES PATENT OFFICE 2,357,329

DIVIDING HEAD

James R. Hansen, Bremerton, Wash., assignor of two-fifths to Gustav Drews, Garden City, N. Y.

Application November 6, 1941, Serial No. 418,033

12 Claims. (Cl. 90—56)

This invention relates in general to dividing heads for machine shop tools, such as milling machines, spiral milling machines, drill presses, and the like.

Among the objects of the present invention it is aimed to provide an improved dividing head for machine shop tools, such as milling machines, spiral milling machines, drill presses, and the like requiring no additional dividing plates, differential gears, or the like.

It is still another object of the present invention to provide an improved dividing head characterized by having the indexing holes on the faces thereof arranged in a spiral instead of in a circle and by having a pin receiving device for cooperating with such spiral indexing holes.

It is still another object of the present invention to provide an improved dividing head characterized by having a reversible control disk provided with spiral rows of indexing holes on both sides thereof constituting one of the main parts of the present invention and an equal number of concentric circular rows of indexing holes on the reverse side of the disk to the spirals respectively. According to well known practice, the circle of holes on either side of the disk may be used with a standard machine shop tool, such as a milling machine, drill press, or the like, to control the cutting operations.

These and other features, capabilities and advantages of the present invention will appear from the subjoined detail description of one specific embodiment thereof illustrated in the accompanying drawings in which Figure 1 is an end elevation of the dividing head operatively associated with a work table;

Fig. 2 is a front elevation of the dividing head showing one face of the control disk drawn to a larger scale than that shown in Fig. 1;

Fig. 3 is a side elevation partly in section on the line 3—3 of Fig. 2 of the dividing head drawn to a scale larger than that shown in Fig. 2;

Fig. 4 is a section on the line 4—4 of Fig. 2;

Fig. 5 is a section on the line 5—5 of Fig. 2;

Fig. 6 is a section on the line 6—6 of Fig. 2; and

Fig. 7 is a section on the line 7—7 of Fig. 2.

In the embodiment shown, the shaft 1 is illustrated as journaled in a housing 2 with a work support, here shown as a work receiving table 3 secured to the upper end thereof. It is, of course, obvious that the shaft 1 is merely illustrative of the main shaft of a machine shop tool, whether rotatable about a vertical axis, a horizontal axis, or an inclined axis of any machine shop tool, such as a milling machine, drill press, or the like.

The shaft 1 is operatively associated with the shaft 4 of the dividing head 5. The operative connection between the shaft 1 and shaft 4 in the present instance is shown as including a worm 6 on the shaft 4 in mesh with a worm wheel 7 on the shaft 1. While not limited to a reduction of 40 to 1, since the rotation of the driving shaft 1 generally is 1 to 40 rotations of the driving shaft 4 in the standard machine shop tool, it will be assumed that the reduction here too is illustrative of the standard 40 to 1 ratio.

The shaft 4, in the present instance, is journaled in the bearing 8 extending from the housing 2 and the shaft 4 extends through and beyond the bearing 8 to receive the gear sleeve 9 in which the shaft 4 is freely rotatable. The gear sleeve 9 is typical of the floating sleeve provided in nearly all heads for spiral milling. When a spiral milling operation is performed, the sleeve 9 with its associated parts is, according to standard practice, operatively connected to rotate with the horizontal table screw of the milling machine. When a dividing or indexing operation only is performed, the sleeve 9 is fixed to some stationary part of the frame or housing 2 such as the extension 10, the extension 10 in the present instance being connected by the screw 11 to the arm 12 which has an enlargement 13 provided with an opening to receive the diminished portion 14 of the sleeve 9, which enlargement 13 in turn is secured or anchored to the shoulder portion 15 of the sleeve 9 by the pin 16.

Also mounted on the diminished portion 14 is the collar 17 which is fixed to travel with the sleeve 9 and the arm 12 by means of the screw 18. On the collar 17, there is rotatably mounted enlargement 19 of the arm 20. The arm 20, in turn, is connected in the first place to the arm 12, in the present instance by the micrometer 21, the stud 22 of the micrometer 21 being pivotally connected by the pin 23 to the outer end of the arm 12, and the graduated cylindrical portion 24 being rotatably mounted in the cap 25 provided with a ball extension 26 swiveled in the enlargement 27 of the arm 20. The arm 20, in the second place, is connected to the dividing guide, here shown as a plate or disk 28 by the spring pressed pin 29. The spring pressed pin 29 is provided with a head 30 having a stem 31 slidably mounted in the housing 32 at the end of the bracket 33 slidably mounted in the slot 34 formed in the arm 20. The pin 29 has a stud 134 formed to engage one of the recesses or holes 35 in the rear face of the disk 28. This pin 29 is in turn provided with a spring 36 tensioned between the shoulder 37 and the inner end of the housing 32, yieldable to urge the stud 134 outward. The bracket 33 is slidably mounted in the slot 34 of the arm 20 so that the stud 134 may either enter and register with one of the holes 35 in the outer circular row of holes 35 or in one of the holes in the intermediate circular row of holes 38 or in the innermost circular row of holes 39, the bracket 33 being provided with a slot 40 to receive the head of the set screw 41, the stem 42 of which cooperates with the slot 43, the head 44 of the stem 42 being in turn secured to the arm 20.

The dividing plate 28, as shown in dotted lines in Fig. 2, is provided with three concentric circular rows 35, 38 and 39 of holes on the rear face of the disk or plate. On the front face this disk is provided with a spiral row of holes 45. This disk 28, as clearly shown in Fig. 3, is rotatably mounted on the diminished portion 14 of the sleeve 9.

Each of the rows 35, 38 and 39 of holes in the present instance is provided with a different number of holes. Furthermore, the holes of each row are in circles concentric to one another.

In the present instance, the spiral, convolute or helical row of holes 45 consists of five complete 360° turns. The holes of the five turns are in turn in alignment with one another radially of the disk 28 and also in alignment with the holes of the row 38. Consequently each 360° turn of the spiral row 45 has 126 holes or recesses. From the foregoing it will thus be seen that the position of a hole in any one of the rows 35, 38, 39 and 45 and, consequently, of the disk 28, may be angularly adjusted relative to the arm 20 according to the adjustment of the micrometer 21. In other words, since a hole in each of the turns in the spiral row 45 is disposed in a radial line relative to the disk 28, if the rear face of the disk 28 containing holes 35, 38 and 39 were used to cooperate with the pin 134 to fix the plate 28 relative to the frame 2 through the extension 10, then since the arm 20 and not the arm 12 is thus fixed to the disk 28 by the stud 134, and the arm 12, and not the arm 20 is fixed to the frame 2 by the screw 11 extending into the extension 10, the position of the disk 28 may still be adjusted relative to the frame 2 by the manipulation of the micrometer 21.

Since, in a dividing or indexing operation, the shaft 4 is to be successively turned relative to the disk, 28, in the present arrangement the shaft 4 has fixed thereto the crank 46 which has operatively connected thereto the pin housing 47 containing the stud or pin 48 for cooperation with one of the holes in the spiral row 45.

For securing the plate 28 in position on the diminished portion 14 of the sleeve 9 against the collar 17, there is provided a collar 49 which is secured to the diminished portion 14 by the screw 50 and has a shoulder 51 extending beyond the diminished portion 14 of the sleeve 9 and engaging the outer or front face of the plate 28. The adjustable angle arms 52 and 53 are rotatably mounted relative to the sleeve 49. In the present instance, the arm 52 has an enlargement 54 rotatably mounted on the collar 49 and the arm 53 is provided with the enlargement 55 rotatably mounted on the collar 56 rotatably mounted on the collar 49. The enlargement 55 is connected by the set screw 57 to the collar 56 and the collar 49 has a flange 58 engaging the outer face of the collar 56 which, in turn, engages the outer face of the enlargement 54 of the arm 52 so that the flange 58 in this way anchors both arms 52 and 53 on the collar 49. After the set screw 57 has been tightened to anchor the arm 53 at a predetermined angle relative to the arm 53, then the arm 52 may through the slot 59 be adjusted a greater or less degree relative to its other position by means of the set screw 60 extending through the collar 56 and into engagement with the stop nut 61 in the slot 62 in the enlargement 54 of the arm 52. The arm 53 (see Fig. 2) is also provided with a slideway 63 to receive the marker slide 64. This marker slide (see Fig. 2) is provided so that the operator may position the marker 64 opposite the predetermined hole or turn in the spiral 45 in order to guide him in arriving at the stopping place when actuating the crank handle 46. This is of value when more than one turn of the handle is required per division.

The pin housing 47, in the present instance, instead of being secured to an integral part of the crank arm 46, is mounted at the end of an arm 65 which is slidably adjustable in the enlargement 66. The position of the arm 65 in the enlargement 66 may be secured in position by the set screw 67. The enlargement 66 in turn has an extension 68 extending through the slide block 69, and connected to the slide block 69 by the screw 70. The slide block in turn is provided with a nut 71 to anchor the slide block 69 in position on the slide 72. The slide 72 (see Fig. 2) has two slots 73 and 74, the slide block 69 being slidably mounted in the slot 73 in the present set-up. One side of the slide 72 is provided with positioning scales 75 and 76. The position of the slide block 69 relative to the scales 75 and 76 will be determined by the pointer 77 (see Fig. 5) secured to the slide block 69. The degree of freedom of rotation of the enlargement 66 relative to the slide block 69 will be determined by the set screw 70.

The slide 72 is adjustably mounted on the arm 78 of the crank 46, such arm 78 having slideways 79 (see Fig. 4) on the rear side to receive the shoulders 80 of the slide 72. A bolt 81 extends from the slide 72 through the slot 82 in the arm 78 to receive the nut 83 on the front end thereof. The slot 82 is provided to afford radial adjustment of the slide 72 relative to the disk 28. On the front face of the arm 78 and adjustably mounted in the slideway 84 there is provided the support 85 through which bolt 81 also extends so that the nut 83 may secure not only the slide 72, but also the support 85 in position. The upper end of the arm 85 is provided with a concave seat 86 to receive the pin housing 47 for the purpose hereinafter to be described. To facilitate proper radial positioning of the slide 72 relative to the disk 28, a scale 87 (see Fig. 3) is formed on one side of the arm 78 and an indicator 88 formed on the slide 72 positioned adjacent to the scale 87.

The crank 46 is preferably secured in place on the front end of the shaft 4 by the screw 89.

When it is desired to reverse the disk 28, it is of course only necessary to remove the screw 89 thereby to remove the crank 46 and associated parts, and then to remove the screw 50 which secures the collar 49 to the sleeve 14 and at the same time anchors the angle arms 52 and 53 in position to cooperate with the front face of the disk 28. Thereupon, after the disk 28 has been reversed and replaced on the sleeve 14, it is only necessary again to position the angle arm assembly 52 and 53, replace the screw 50, replace the crank 46 and associated parts on the front end of the shaft 4 and replace the screw 89. The pin housing 47 (see Fig. 3), is provided with a spring 90 for normally urging the pin portion 48 outward, such spring 90 being positioned between the shoulder 91 of the pin 48 and the shoulder 92 of the housing 47. The pin 48 is provided with a shank 93 extending to and beyond the front end of the housing 47 there to receive the control head 94. The housing 47 is also provided with two recesses, a long recess 95 and a short recess 96 to cooperate with the pin 97. When the pin 97 is positioned in the recess 95 as shown, the pin 48 is in extended position to enter an opening in the disk 28, whereas when the pin 97 is positioned in the recess 96, then the pin 48 just clears the disk 28.

In place of the disk 28 having a plurality of spiral rows of holes 45 on one face and a plurality of circular rows of holes 35, 38 and 39, several disks having different arrangements of holes may be provided without departing from the general spirit of the invention. As an instance, there may be provided a disk having cne spiral row of holes on one face of one pitch and a certain number of holes per turn and another spiral row on the other face of the same pitch, but having a different number of holes per turn. A circle must cooperate with the spiral. When a number of disks having only one spiral and one circle on each side are used, these circles and spirals should be the same distance from the center on all of the plates or disks. This construction would enable the rest or support 86 and the pin housing 32 to remain stationary. It has been calculated, as an instance, that with a set of three disks each having two spiral rows of holes and two circular rows of holes, one spiral row and one circular row on each face, each spiral having five turns and each spiral having a different number of holes, as an instance, 132, 126, 114, 111, 102 and 78 holes per turn, they would cover all divisions from 2 to well over 400.

When as in the last example the machine is equipped with three disks, each having a pair of spiral rows of holes, but different in number, the first disk having on one face 132 holes per turn and on the other face 126 holes per turn, the second disk having on one face 114 holes per turn and 111 holes per turn on the other face, and the third disk having on one face 102 holes per turn and on the other face 78 holes per turn, then the disks can be arranged so that with each different spiral in the triple spiral disk a different adjustment of the support 85 may be made by a rather simple expedient. As an instance, the support may be provided with three holes, 98, 99 and 101, disposed one above the other radially of the disk to register with an opening in the arm 78 in line with the hole 98, see Fig. 3, and then, after the required registration has been made, a pin 102 may be placed in the registering holes to fix the position so selected. For certain purposes the hole 98 will register with the aforementioned opening in arm 78 when the first spiral is used. When the third spiral on the triple spiral plate is in use, hole 101 in support 85 will register with the hole in arm 78.

The idea of the spiral arrangement, namely, the use of the spiral rows of holes, is to make it possible to lose or gain a given number of holes in a given number of degrees of revolution of the handle 46. For example, with the arrangement illustrated in Fig. 2, two holes are lost in one revolution. The arc 103 passes through the fourth hole on the second turn of the spiral showing that the proportion of loss is constant. The effect is the same, therefore, as with a standard plate having 124 holes instead of 126 holes, the number of holes per turn in the plate 28. When the arm 65 is operatively associated with the slot 74, instead of losing holes per turn, it is possible to grain holes per turn, it of course being assumed that the handle 46 will be turned clockwise relative to the disk 28 during the operation thereof. In Fig. 2, for instance, if the block 69 were located in the same relative position in the slot 74 that it now occupies in the slot 73, each revolution of the crank handle 46 would intercept 128 holes instead of 124.

It should also be noted that the gain or loss of any given number of holes is not confined to complete or unit turns of the handle 46. Requirements might make it necessary to lose two holes in one and one-half turns of the handle. The radius of the arm 65 then would have to be longer as measured on the scale 75. If it had been one and two-thirds turns, the radius would have to be still longer. These fractional turns are limited only by the number of holes on the division circle 35. A marker 104 is provided to indicate fractional turns and the number of complete turns.

When the marker is reached by the pin 48 in its course along the spiral, the standard headlock is set to make sure the shaft 4 will not turn, and the pin housing 47 is returned to its rest or support 86. The pin 97 is dropped in the half way hole 96. In this position, the pin 48 will just clear the plate 28. The pin 134 is then withdrawn and the plate turned until the first hole on the spiral 45 is again opposite the tip of pin 48. The operation is then repeated. For some of the low numbers where more than one turn of the handle is required per division, a marker slide 64 is provided for use by the operator if he so desires. The arm 52 has two positions as indicated. The angle 105 is ascertained and thereupon the stop nut 61 and the set screw 60 positioned wherein the angle 105 will correspond to the number of holes to be gained or lost per group. This feature is added so that the operator does not have to count the number of holes of correction at the end of each group.

Specific examples will now be given showing the use of a disk having a spiral row of holes 45 with 126 holes per turn. First we will describe an example where the result comes out even and then one where the micrometer 21 is used to make a small correction. These correction factors are ordinarily so small that they could easily be ignored practically, but where extreme accuracy is necessary the micrometer 21 is used. It might also be stated that the majority of problems have no correction factor.

However, to return to the example where the result comes out even: Let it be required to divide the circle into "553" parts. Our base number will be 5040, that is, 126 times 40 equals 5040, taking into account the ratio of 40 to 1 of the shaft 4 to the shaft 1. If the base number is 5040 and it is divided by the number "553," the quotient will be 9 with a remainder of "63." In terms of holes, it will then be necessary to lose "63" holes in the 40 turns of the handle 46. Since it is desirable to lose as few holes per group within limits as possible, we will elect to lose "3" holes per group in this case. That makes 21 groups. Furthermore, if the number of holes to be lost, "63," is subtracted from our base number "5040," our new corrected base number will be "4977" which is exactly divisible by the number to be divided, "553." If this new corrected base number "4977" is then divided by the number of groups, to wit, "21," the number of holes in each group is found to be "237." The group marker 104 will now be set at the 237th hole on the spiral (see Fig. 2). That is, dividing 237 by 126, the number of holes per turn will call for one complete turn of the handle 46 and a further turn until the 111th hole in the next turn of the spiral will have been reached. The marker 104 as aforesaid (see Fig. 2) has been placed on this 237th hole of the spiral 45 or the 111th hole of the second turn of the spiral 45. The angle 105 is set for three holes and the angle 106 is, on the other hand, set for 9 holes. The angle 106 of 9 holes is used for all divisions except where the marker is included in the angle and a return to the starting hole has to be made in which case the arm 52 is pushed back against the stop 107 to include 12 holes. This latter operation occurs 20 times in this case where there are twenty-one groups.

The next example to be explained calls for a small correction. As an instance, where it is required to divide the circle into 383 parts. In such case there will be a remainder, a small fractional part of one hole which must be compensated by the micrometer 21. The original base number "5040" will again be divided by the new number "383" giving a quotient of 13 with a remainder of 61. The corrected denominator then will be 4979 which contains the new number to be divided, "383," exactly thirteen times. The remainder "61" in terms of holes must, however, be lost. This time four holes will be lost to the group in which case divide the remainder "61" by "4," and the result roughly will be 15¼ groups. Now take the new base number "4979," multiply it by "4" and divide by "61" and the result will be $326^{30}/_{61}$. The marker 104 will now be set at the 326th hole on the spiral. The total error to be taken care of by the micrometer 21 is determined by a simple proportion. The answer flowing from this proportion also indicates whether the micrometer 21 is to be closed or opened to make this correction. The proportion is $$326:(326+4)::4979:x,$$

in which $x$ will equal $5040^{30}/_{326}$, that is, $5040^{15}/_{163}$. The handle 46 will, therefore, have turned $^{15}/_{163}$ of a hole too far. The correction must be made by turning the plate 28 that much to the left. This is done by closing the micrometer 21. The distance between the holes at the radius of the micrometer is 0.259 inch. The 0.259 inch is obtained as follows and it represents the distance between the holes at the radius of the micrometer, in this case the radius is $5\frac{3}{16}$ inches, as can be seen by scaling the drawing. The diameter will equal 10⅜ inches, 10.375 inches. Multiply by pi or 3.1416 to obtain the circumference, that is, 32.5941000. The circumference of the circle described or traveled by the micrometer is thus 32.594 inches. There are 126 sectors or holes. Therefore, the distance between these sector points at the radius of the micrometer is found by dividing 32.594 by 126, obtaining 0.2586 or 0.259. This distance 0.259 is measured on the circle instead of by a straight line between sector points, but the difference would be infinitely small.

The error is equal to $^{15}/_{163}$ of a hole or sector, but the sector measures 0.259 inch. Therefore, to convert the error, expressed as a fractional part of the distance between two points, into terms of inches, it is necessary to multiply the one by the other, that is $^{15}/_{163}$ by 0.259, equalling 0.0238 or 0.024. This distance 0.024 is measured on the micrometer in the usual way.

It is obvious that if this distance were measured on a smaller portion of the wedge or sector that is, nearer the center of the disk, that this error expressed in terms of $\frac{1}{1000}$ of an inch on the micrometer would be much smaller. The point is that, if the size of the disk were reduced, the micrometer would also be nearer the center of the disk and, hence, the reading 0.024 inch could not be produced, but a much smaller reading, proportionate to the radial distances, would be produced.

This 0.024 inch loss can be spread as the operator desires, or for nearly all practical purposes can be ignored. The angle 106 will now be set for 13 holes and the angle 105 for 4 holes, in which case the number "13" is determined from the quotient when the number "383" is divided into "5040" and the number "4" is determined by the number of holes lost.

To further show the flexibility of this device, the number "383" of the last example will again be used as the divider, in this case for losing three holes of the group instead of four holes. Here the new base number "4979" will be multiplied by "3" and divided by "61" to equal $244^{53}/_{61}$. The marker 104 will now be placed at the 245th hole on the spiral, that is, one complete turn of 126 holes and 119 additional holes of the second turn. Our proportion then will be $$245:245+3::4979:x,$$

in which case $x$ will equal $5039^{237}/_{245}$. Then, if this new number $5039^{237}/_{245}$ is subtracted from 5040, the result will be $^{8}/_{245}$ and in the terms of holes will equal a total error of $^{8}/_{245}$ of a hole. Now, multiplying $^{8}/_{245}$ by 0.259 inch, the answer will be 0.008 inch, the total correction on the micrometer for the entire 383 divisions. The micrometer will now be opened because the value of $x$ is under 5040. In other words, the ratio is 40 to 1, so there are 5040 holes passed by the handle for every turn of the worm gear and the job, i. e., 126×40=5040. But the error is equal to $^{8}/_{245}$ of the distance between two of these holes. In other words, the error in terms of revolution of the job is reduced 40 to 1 in terms of revolution of the handle. Stated another way, it would be clear that, if the error was one hole on the dial, then that error would be $\frac{1}{5040}$ of one revolution inasmuch as it takes 5040 holes to make a revolution of the job.

But the error is not one hole. It is a very small fractional part of one hole, namely, $^{8}/_{245}$ of one hole. Therefore, the error stated in terms of revolutions of the job, must be proportionately smaller. The correct fractional equivalent is found by multiplying the two fractions together, namely $^{8}/_{245}$ multiplied by $\frac{1}{5040}$ equals $\frac{1}{154350}$. Translated into terms of revolution of the job, the error to be corrected is equal to $\frac{1}{154350}$ of one revolution.

With reference to the stop 107 and the method of adjusting angle 105 of Fig. 3, the pin, not visible from the outside, is pressed into collar 56 and operates in the slot in the enlargement of arm 52, said enlargement being designated 54. The angle 105 is now set for three holes and the angle 106 for thirteen holes.

In conclusion, one example on the gain side will appear from the following: Divide a circle into 128 parts. If the base number 5040 is divided by 128, the result will be "39" with a remainder of "48." It is, of course, obvious that the 48 holes could be taken care of on the "lose" side by setting the angle 106 for thirty-nine holes. If, however, as aforesaid we solve the problem by working it on the "gain" side, then "128" times "40" equals "5120" which will be the corrected denominator on the gain side and consequently subtracting "5040" from "5120" eighty holes will be gained. If we allow two holes to be gained per group, it will call for forty groups in which case the corrected denominator "5120" divided by "40" will equal "128." Now the marker 104 will be set at the 128th hole, and the slide block 69 will be transferred to the slot 74 positioning the arm 65 to scale reading from a prepared chart to "gain" two holes in each group of 128 holes on the spiral. In this case, the pin 48 will drop back to the starting point and the plate will not have to be moved. Since there are 126 holes per turn of the spiral, 126 plus the two holes gained will equal 128 holes. Consequently, the angle 105 will be set for two holes. In this case there will be forty holes for each division except where the marker is included in the angle between the arms 52 and 53, the pin returning to the starting hole adds two holes so that these must be subtracted from the standard angle. Consequently, the angle 106 will now be set to include 38 holes.

On the losing side, that is when the slide block 69 is located in the slot 73, the standard angle is the angle 106 and the angle 105 is the correction angle which is to be added. When the slide block 69, however, is mounted in the slot 74, that is on the gain side, the standard angle includes both the angles 105 and 106 and the corrected angle is subtracted.

It is conceivable that the disk 28 shown in Fig. 2 with the three circular rows of holes 35, 38 and 39 while concentric may each have a different number so that these circular rows of holes on the front and the rear face of the disk with the circular rows of holes may be used as the ordinary dividing head plate having circular concentric rows of pin holes. In order to facilitate positioning pin 134 so that it may cooperate with one or another of the rows of holes 35, 38 and 39, as shown in Fig. 3, the set screw 41 is manipulated to free the slide 33 in turn to position the pin 134 to register with one or another of the rows of holes 35, 38 or 39.

The marker 104 above referred to, as shown in Fig. 7, consists of a stem 117 having a head 108, the stem 117 being conformed to fit snugly in any one of the holes of the spiral rows 45. The marker may either be inserted in the final hole of the group or in the hole of the next turn so that its pointed end 109 will point toward and indicate the final hole of the series.

It is obvious that various changes and modifications may be made to the details of construction without departing from the general spirit of the invention set forth in the appended claims.

I claim:

1. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a pin holder operatively associated with said handle, and a pin operatively mounted in said holder to enter any one of the openings in said spiral row of pin receiving openings.

2. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support mounted on and extending transversely of said handle, an arm operatively mounted on said support to assume a predetermined angle with said support, a pin holder secured to the end of said arm, and a pin operatively mounted on said holder to enter any one of the openings in said spiral row of pin receiving openings.

3. In a dividing head for a machine shop tool, the combination of a control shaft operatively associated with the main shaft of the machine shop tool, a dividing disk rotatably mounted on said control shaft, a device locking said disk against movement with said control shaft, said disk having a spiral row of pin receiving openings, a handle mounted on said control shaft, a pin holder operatively associated with said handle, a pin operatively mounted in said holder to enter any one of said openings, two angle forming arms adjustable to form various angles with one another to space off predetermined groups of openings in said disk, said angle forming arms being mounted on said control shaft, means for locking said handle to said control shaft, and other means for anchoring said angle forming arms and disk on said control shaft.

4. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support extending transversely of, and fixed to, said handle and having a slideway to either side of said handle, an arm adjustably mounted in either of said slideways to assume a predetermined angle with said support, a pin holder secured to the end of said arm, and a pin operatively mounted in said holder to enter any one of said openings.

5. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support extending transversely of, and fixed to, said handle and having a slideway to either side of said handle, an arm adjustably mounted in either of said slideways to assume a predetermined angle with said support, a pin holder secured to the end of said arm, a pin slidably mounted in said holder, and a spring for urging said pin upward into one of said openings when in registration with said pin.

6. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support extending transversely of, and fixed to, said handle and having a slideway to either side of said handle, an arm adjustably mounted in either of said slideways to assume a predetermined angle with said support, a pin holder secured to the end of said arm, a pin slidably mounted in said holder, a spring for urging said pin upward into one of said openings when in registration therewith, and means for anchoring said pin against the tension of said spring to maintain it clear of said disk.

7. In a dividing head for a machine shop tool, the combination of a control shaft operatively associated with the main shaft of the machine shop tool, a dividing disk rotatably mounted on said control shaft, a device locking said disk against movement with said control shaft, said disk having a spiral row of pin receiving openings, a handle mounted on said control shaft, a pin holder operatively associated with said handle, a pin operatively mounted in said holder to enter any one of said openings, two angle forming arms adjustable to form various angles with one another to space off predetermined groups of openings in said disk, said angle forming arms being mounted on said control shaft, means for locking said handle to said control shaft, means for anchoring said angle forming arms and disk on said control shaft and a device for anchoring said disk against movement with said control shaft.

8. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a slide support extending transversely of, and fixed to, said handle and having a slideway to either side of said handle, an arm adjustably mounted in either of said slideways to assume a predetermined angle with said support, a pin holder secured to the end of said arm, a pin operatively mounted in said holder to enter any one of said openings and a device for anchoring said disk against movement with said control shaft.

9. In a dividing head for a machine shop tool, the combination of a control shaft operatively associated with the main shaft of the machine shop tool, a handle fixed to said control shaft, a dividing disk rotatably mounted on said control shaft and having a spiral row of pin receiving openings, a pin holder operatively associated with said handle, a pin operatively mounted in said holder to enter one of said openings, an arm rotatably mounted on said control shaft, means for anchoring said arm against movement with said control shaft, a second arm rotatably mounted on said control shaft, a connection between the free ends of said arms including a micrometer screw for effecting an adjustment, and a device for anchoring said second arm to said disk.

10. In a dividing head for a machine shop tool, the combination of a control shaft operatively associated with the main shaft of the machine shop tool, a handle fixed to said control shaft, a dividing disk rotatably mounted on said control shaft and having a spiral row of pin receiving openings, a pin holder operatively associated with said handle, a pin operatively mounted in said holder to enter one of said openings, an arm rotatably mounted on said control shaft, means for anchoring said arm against movement with said control shaft, a second arm rotatably mounted on said control shaft, a connection between the free ends of said arms including a micrometer screw for effecting an adjustment, a second pin holder on said second arm, a second pin slidably mounted in said second pin holder, there being a row of pin receiving openings in the rear of said disk, and a spring for urging said second pin into one of said latter openings to anchor said second arm to said disk.

11. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a pin holder operatively associated with said handle, a pin operatively mounted in said holder to enter any one of the openings in said spiral row of pin receiving openings, and a marker secured to said disk to indicate the last of a group of openings constituting a division.

12. In a dividing head for a machine shop tool, the combination of a control shaft operatively associated with the main shaft of the machine shop tool, a dividing disk rotatably mounted on said control shaft, a handle fixed to said control shaft, a device locking said disk against movement with said control shaft, said disk having a spiral row of pin receiving openings, a pin holder operatively associated with said handle, a pin operatively mounted in said holder to enter any one of the openings in said spiral row of pin receiving openings, and a marker having a pin formed to be positioned in one of the pin receiving openings in said disk to designate the last of a group of openings constituting a division.

JAMES R. HANSEN.